US011550079B2

(12) United States Patent
Sengupta et al.

(10) Patent No.: US 11,550,079 B2
(45) Date of Patent: Jan. 10, 2023

(54) METHOD OF ESTIMATING ELASTIC PROPERTIES OF KEROGEN USING MULTI-SCALE DATA INTEGRATION

(71) Applicant: Saudi Arabian Oil Company, Dhahran (SA)

(72) Inventors: Madhumita Sengupta, Houston, TX (US); David Jacobi, Spring, TX (US)

(73) Assignee: Saudi Arabian Oil Company, Dhahran (SA)

( * ) Notice: Subject to any disclaimer, the term of this patent is extended or adjusted under 35 U.S.C. 154(b) by 1029 days.

(21) Appl. No.: 16/252,129

(22) Filed: Jan. 18, 2019

(65) Prior Publication Data

US 2020/0233114 A1 Jul. 23, 2020

(51) Int. Cl.
*G01V 1/50* (2006.01)
*G01V 1/30* (2006.01)
*G01V 99/00* (2009.01)

(52) U.S. Cl.
CPC .............. *G01V 99/005* (2013.01); *G01V 1/50* (2013.01); *G01V 2210/6242* (2013.01)

(58) Field of Classification Search
CPC ................... G01V 99/005; G01V 1/50; G01V 2210/6242; G01V 1/30; G06F 2111/10; G06F 30/20
USPC .......................................................... 367/25
See application file for complete search history.

(56) References Cited

U.S. PATENT DOCUMENTS

2013/0013209 A1  1/2013  Zhu et al.
2014/0067351 A1  3/2014  Gray et al.
2017/0235016 A1  8/2017  Prioul et al.

OTHER PUBLICATIONS

GCC Examination Report in Gulf Cooperation Council Appln. No. GC 2020-39022, dated Apr. 12, 2021, 4 pages.
International Search Report and Written Opinion issued in International Application No. PCT/US2020/014004 dated May 12, 2020, 14 pages.
Al-Kattan and Al-Ameri, "Estimation of the Rock Mechnical Properties Using Conventional Log Data in North Rumaila Field," Iraqi Journal of Chemical and Petroleum Engineering, vol. 13, No. 4, Dec. 2012, 7 pages.
Archer and Rasouli, "A log based analysis to estimate mechanical properties and in-situ stresses in a shale gas well in North Perth Basin," Petroleum and Mineral Resources, WIT Transactions on Engineering Sciences, vol. 81, 2012, 12 pages.
Behura et al., "The shear properties of oil shales," Special Selection: Unconventional Resources and CO2 Monitoring, The Leading Edge, Jul. 2009, 6 pages.

(Continued)

*Primary Examiner* — Daniel L Murphy
(74) *Attorney, Agent, or Firm* — Fish & Richardson P.C.

(57) ABSTRACT

The present disclosure is directed to numerically estimating the shear modulus of Kerogen by using a combination of mineralogy from digital image analysis and sonic log analysis, when measured data on only one elastic constant (Bulk, Young's or P-wave modulus) is available. In some instances, elastic properties predicted from the digital images are compared with sonic, shear, and density logs, to estimate the shear modulus of kerogen. As a one-to-one correspondence is not expected between the core sub-samples and the rock unit sampled by the well logs, cross-property relations can be used to identify the suitability of the effective medium models and to iteratively determine the shear modulus of kerogen.

21 Claims, 6 Drawing Sheets

(56) References Cited

OTHER PUBLICATIONS

Bousige et al., "Realistic molecular model of kerogen's nanostructure," Nature Materials, Advance Online Publication, Feb. 1, 2016, 8 pages.

Elkatatny et al., "Development of a new correlation to determine the static Young's modulus," Journal of Petroleum Exploration and Production Technology, vol. 8, Issue 1, Mar. 2018, 14 pages.

Han et al., "Chapter 2: Principles of Drilling and Excavation," in Drilling in Extreme Environments: Penetration and Sampling on Earth and Other Plants, Aug. 2009, 107 pages.

Havens, "Mechanical Properties of the Bakken Formation," thesis for degree of Master of Science (Geophysics) at the Colorado School of Mines, Department of Geophysics, 2012, 123 pages.

Kadhim et al., "Using Well Logs Data to Estimate Dynamic Elastic Properties of Carbonate Formation," International Journal of Physical and Human Geography, vol. 4, No. 2, Jun. 2016, 15 pages.

Khatibi et al., "Raman spectroscopy to study thermal maturity and elastic modulus of kerogen," International Journal of Coal Geology, vol. 185, Jan. 2, 2018, 16 pages.

Kwabi, "Mineral, Fluid, Elastic Property Quantification from Well Logs and Core Data in the Eagle Ford Shale Play: A Comparative Study," thesis for Degree of Master of Science and Engineering at the University of Texas at Austin, Aug. 2013, 135 pages.

McCann and Entwisle, "Determination of Young's modulus of the rock mass from geophysical well logs," Geological Applications of Wireline Logs II, Geological Society of Special Publication No. 65, Dec. 1, 1992, 9 pages.

Montaut et al., "Detection and quantification of rock physics properties for improved hydraulic fracturing in hydrocarbon-bearing shale," SPWLA 54th Annual Logging Symposium, Jun. 22-26, 2013, 16 pages.

Potter and Foltinek, "Formation elastic parameters by deriving S-wave velocity logs," CREWES Research Report—vol. 9, Jan. 1997, 13 pages.

Prasad et al., "Acoustic Signatures, Impedance Microstructure, Textural Scales and Anisotrophy of Kerogen-Rich Shales," SPE 124840-MS, Society of Petroleum Engineers, SPE, Annual Technical Conference and Exhibition, Oct. 4-7, 2009, 13 pages.

Sharma and Arya, "Formation strength estimation from well log data for sand cut analysis in Tapti—Daman Area, Western Offshore Basin, India," presented at the 6th International Conference and Exposition on Petroleum Geophysics, Kolkata 2006, Jan. 9-11, 2006, 4 pages.

Sone and Zoback, "Mechanical properties of shale-gas reservoir rocks—Part 1: Static and dynamic elastic properties and anisotropy," Geophysics vol. 78, No. 5, Sep.-Oct. 2013, 12 pages.

Vernik and Landis, "Elastic Anisotropy of Source Rocks: Implications for Hydrocarbon Generation and Primary Migration," vol. 80, Issue 4, Apr. 1996, 14 pages.

Vernik and Nur, "Ultrasonic velocity and anisotropy of hydrocarbon source rocks," Geophysics vol. 57, Issue 5, May 1992, 9 pages.

White et al., "A thermoplasticity model for oil shale," LLNL-CONF-667671, Lawrence Livermore National Labtoratory, presented at the Fifth International Conference on Coupled Thermo-Hydro-Mechanical-Chemical Processes in Geosystems, Feb. 25-27, 2015, 20 pages.

Yan and Han, "Measurement of elastic properties of kerogen," SEG Houston 2013 Annual Meeting, SEG Technical Program Expanded Abstracts, Sep. 2013, 5 pages.

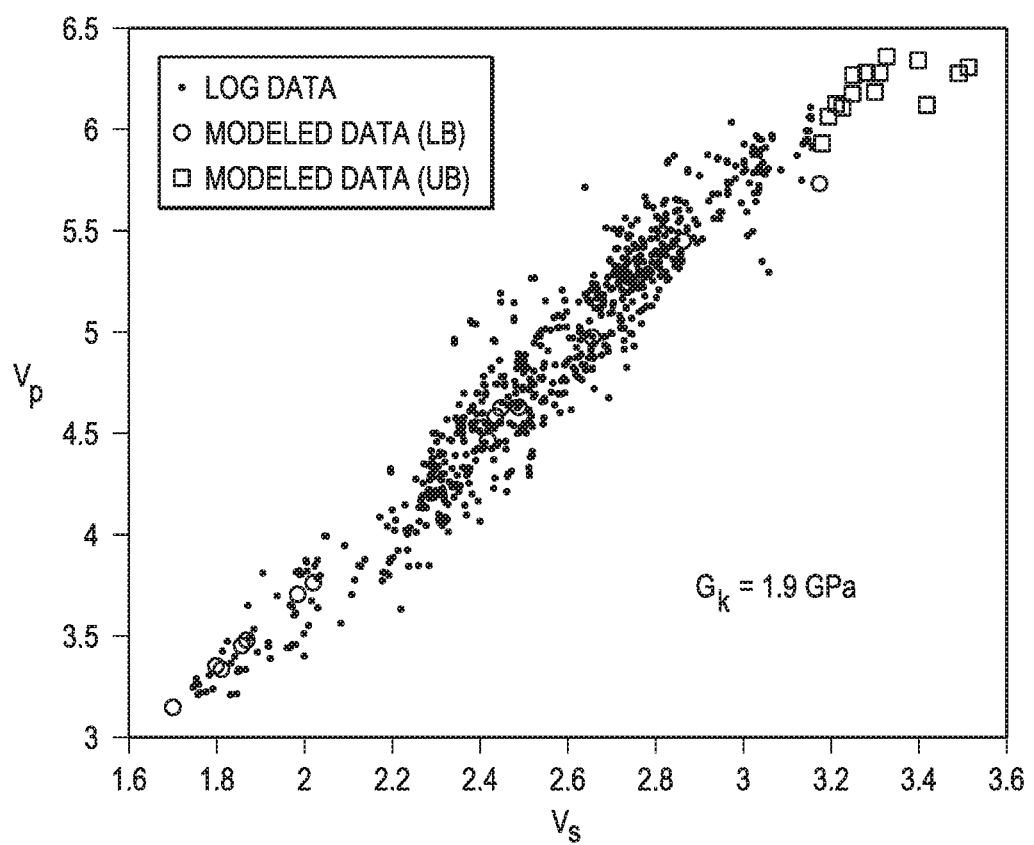

000# METHOD OF ESTIMATING ELASTIC PROPERTIES OF KEROGEN USING MULTI-SCALE DATA INTEGRATION

TECHNICAL FIELD

This disclosure relates to estimating elastic properties of kerogen.

BACKGROUND

Elastic properties of kerogen are widely variable and difficult to measure. Kerogen is generally accepted to be an isotropic solid, hence, two elastic moduli are required to characterize its elastic behavior and seismic response. Although one of the elastic moduli of kerogen (e.g. bulk modulus) may be measured, the measurement of the second elastic modulus (shear modulus) has been difficult.

SUMMARY

This disclosure relates to estimating the Shear modulus of kerogen.

Certain aspects of the subject matter described here can be implemented as a method.

This, and other aspects, can include one or more of the following features.

The present disclosure is directed to numerically estimating the shear modulus of Kerogen by using a combination of mineralogy from digital image analysis and sonic log analysis, when measured data on only one elastic constant (Bulk, Young's or P-wave modulus) is available. In some instances, elastic properties predicted from the digital images are compared with sonic, shear, and density logs, to estimate the shear modulus of kerogen. As a one-to-one correspondence is not expected between the core sub-samples and the rock unit sampled by the well logs, cross-property relations can be used to identify the suitability of the effective medium models and to iteratively determine the shear modulus of kerogen.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-5C are exemplary cross-plots of numerical calculations and effective medium models of shear velocity and compressional velocity.

Like reference numbers and designations in the various drawings indicate like elements.

DETAILED DESCRIPTION

Kerogen is an organic, macromolecular, crosslinked biopolymer that has the properties of an elastomer. It is composed of macerals, which are fossil organic detritus derived from algal, lignin, and vascular plant sources. Liptinite, vitrinite and inertinite are the main maceral groups, the dominance of which determines the type of kerogen. As a result of its maceral variability kerogen does not necessarily have a specific molecular composition; it can vary in chemistry depending upon the source of the organic matter and the depositional environment of the rock that contains the organic matter. Therefore to better characterize the mechanical properties of a particular sedimentary rock formation, specific mechanical properties of the individual constituents of the sedimentary rock formation must be understood. While mechanical properties of the individual constituents of the sedimentary rock formation may be known, not all mechanical properties of the organic constituents, such as kerogen, are known. Accordingly, a method is required that determines the unknown elastic properties of kerogen in order to fully characterize a particular sedimentary rock formation.

Figure 1:
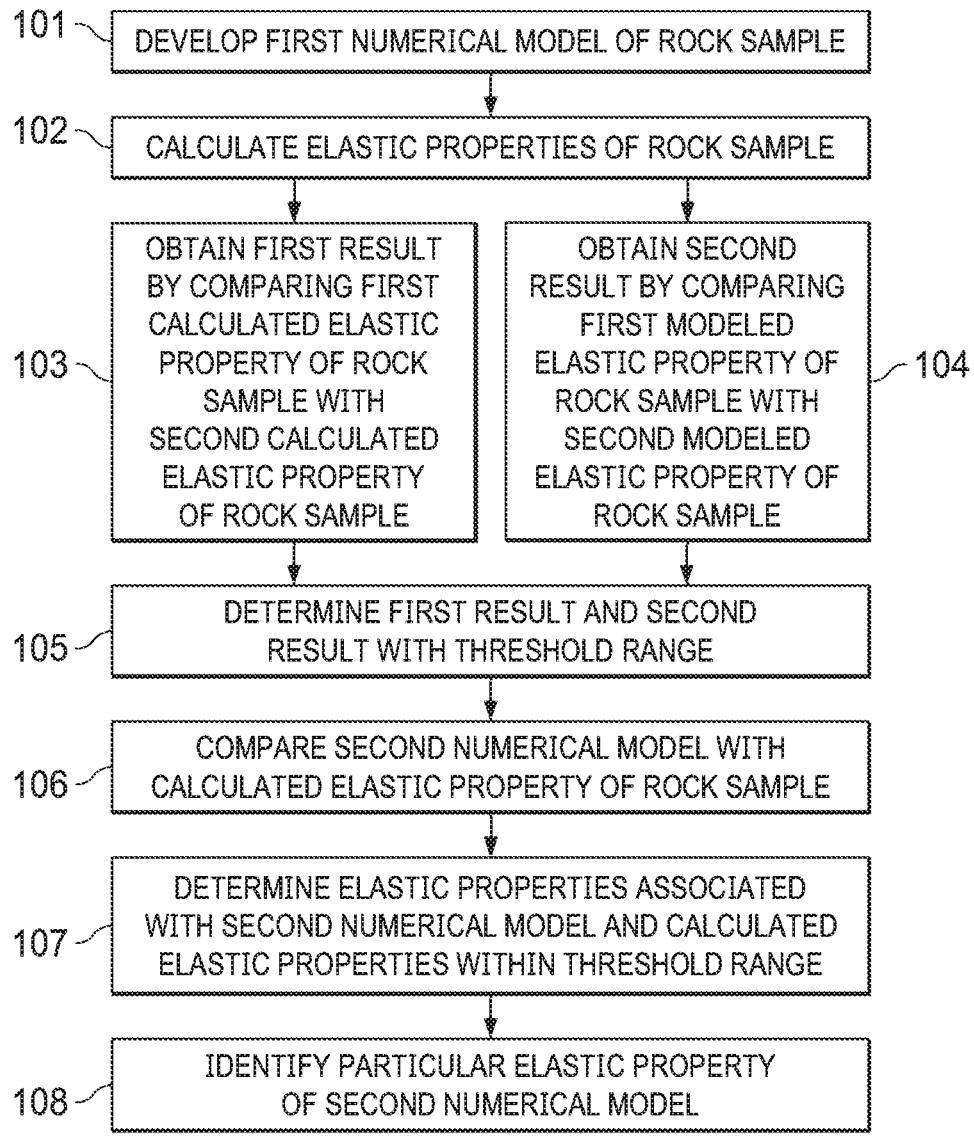
FIG. 1 is a flowchart showing an exemplary modeling process.

FIG. 1 is a flowchart showing an exemplary modeling process. In FIG. 1, at Step 101, a numerical model of elastic properties of a rock sample is developed. In some implementations, the rock sample includes sedimentary rock. For example, elastic properties of mineral constituents of the sedimentary rock, which are known, and elastic properties of organic matter, such as kerogen, which are not completely known, are considered when developing the numerical model of rock sample. For the unknown elastic properties of kerogen, an estimate may be made. For example, since the bulk modulus of kerogen is known, or may be measured, the shear modulus of kerogen is estimated.

At Step 101, a volume fraction of mineral constituents and a volume fraction of kerogen are calculated based upon the rock sample. The numerical model may include elastic properties of the rock sample, including density, volume fractions of mineral constituents and kerogen, elastic properties of the mineral constituents, bulk modulus of kerogen, and an estimate of shear modulus of kerogen.

At Step 102, elastic properties of the rock sample are calculated. In some implementations, the elastic properties of the rock sample may be known or may be measured. For example, elastic properties of the individual constituents of the rock sample may be calculated based upon known composition of the rock sample, for example elastic properties of the constituent minerals and kerogen. Additionally, bulk modulus K, shear modulus G, compression velocity Vp, shear velocity Vs, and density of the rock sample may be measured, or may be known and easily obtained.

At Step 103, a comparison is made between the calculated elastic properties of the rock sample of Step 102. In some implementations, a first result may be obtained by comparing particular calculated elastic properties of the rock sample. For example, the first result may be obtained by comparing the measured volume fraction of kerogen within the rock sample and the measured density of the rock sample. In some implementations, the first result includes a graphical representation of the comparison of the measured volume fraction of kerogen within the rock sample and the measured density of the rock sample.

At Step 104, a comparison is made between the modeled elastic properties of the rock sample of Step 101. In some implementations, a second result may be obtained by comparing particular modeled elastic properties of the rock sample. For example, the second result may be obtained by comparing the modeled volume fraction of kerogen within the rock sample and the modeled density of the rock sample. In some implementations, the second result includes a graphical representation of the comparison of the modeled volume fraction of kerogen within the rock sample and the modeled density of the rock sample.

At Step 105, a determination is made whether the calculated elastic properties of the rock sample of Step 102 and the modeled elastic properties of the rock sample of Step 101 reasonably match. In some implementations, the determination may be made by graphically cross-plotting the first result and the second result, and then determining if a match exists. For example, if the graphical cross-plot of the first result and second result are within a threshold range, then a determination can be made that the first result and the second result match. However, if the graphical cross-plot of the first result and second result are not within a threshold range, then a determination can be made that the first result and the second result do not match. In this case, Steps 101 and 102 may need to be iteratively repeated with a revision for the estimated shear modulus.

At Step 106, a second numerical model may be compared to the elastic properties of the rock sample calculated at Step 102. In some implementations, elastic properties associated with the second numerical model may be compared to the elastic properties of the rock sample calculated at Step 102. For example, compression velocity Vp and shear velocity Vs of another rock sample associated with the second numerical model may be compared to the compression velocity Vp and the shear velocity Vs of the rock sample calculated at Step 102. In some implementations, a graphical cross-plot representation of the relationship between the compression velocity Vp and the shear velocity Vs of the second numerical model may be displayed with the compression velocity Vp and the shear velocity Vs of the rock sample calculated at Step 102.

At Step 107, a determination is made whether the elastic properties associated with the second numerical model and the calculated elastic properties of the rock sample of Step 102 reasonably match. In some implementations, the second numerical model may be selected from one or more effective-medium models, each of the effective-medium models comprising modeled elastic properties of different rock samples. Accordingly, numerous comparisons may be necessary in order to select a particular second numerical model from the effective-medium models, in which the elastic properties associated with the selected particular second numerical model reasonably match the calculated elastic properties of the rock sample of Step 102. For example, the graphical cross-plot representation of the relationship between the compression velocity Vp and the shear velocity Vs of Step 106 may be compared to similar graphical cross-plots of each of the effective-medium models in order to select a particular second numerical model.

At Step 107, a threshold range may be established in order to determine whether the elastic properties associated with the selected second numerical model match the calculated elastic properties of the rock sample of Step 102. In some implementations, the threshold range may be predefined. For example, the threshold range may be determined prior to Step 107. In some implementations, the threshold range may be adjusted during Step 107. For example, while determining whether a match exists between the elastic properties associated with the effective-medium models and the calculated elastic properties of the rock sample of Step 102, if matches are determined with multiple effective-medium models, then the threshold range may be reduced to limit the matches. Conversely, while determining whether a match exists between the elastic properties associated with the effective-medium models and the calculated elastic properties of the rock sample of Step 102, if no matches are determined with the effective-medium models, then the threshold range may be increased to increase the matches.

At Step 108, a particular one of the elastic properties associated with the selected second numerical model may be identified based upon a type of elastic property. In some implementations, the type of elastic property for identification may include shear modulus. For example, identifying a shear modulus of kerogen as being the type of elastic property will allow for confirmation of the estimated shear modulus of kerogen in Step 101. Since the first numerical model developed at Step 101 has been confirmed by the determination at Step 105, then some of the elastic properties associated with the selected second numerical model may be inferred for elastic properties that were estimated for the first numerical model. In the present implementation, since the shear modulus of kerogen differs widely and is difficult to measure, inferring the shear modulus of kerogen from effective-medium models that mimic the calculated elastic properties of the rock sample of Step 102 allows for an implicit determination of the shear modulus of kerogen in the first numerical model of the rock sample.

Figure 2:
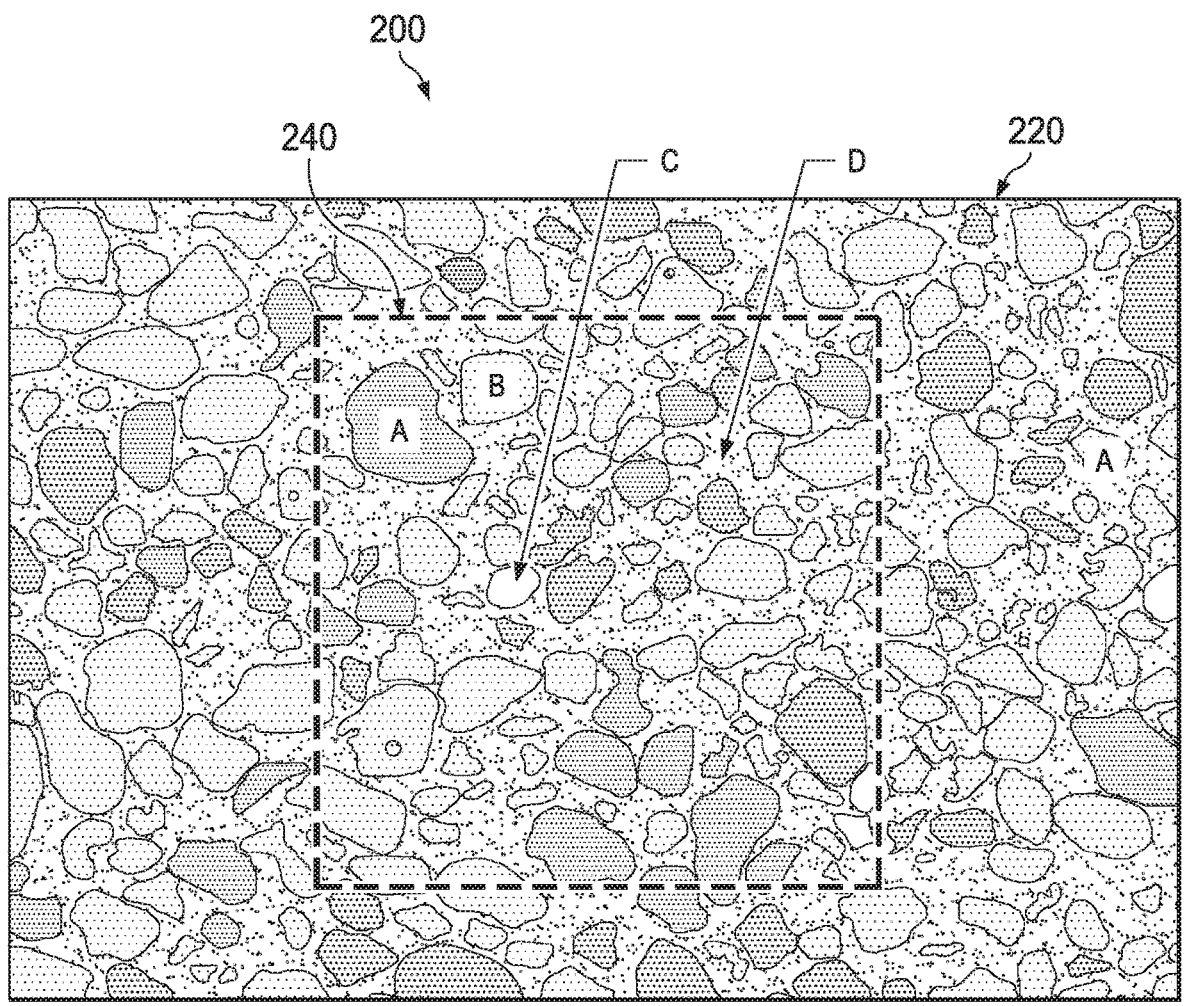
FIG. 2 is a scanning electron microscopy (SEM) image of an exemplary sedimentary rock sample.

FIG. 2 is a scanning electron microscopy (SEM) image 20 of an exemplary sedimentary rock sample 22. The sedimentary rock sample 22 depicted in the SEM image 102 includes various constituents A, B, C, and D. In some implementations, constituents A, B, and C may comprise non-organic material(s), such as minerals, and constituent D may comprise organic material, such as kerogen. In other implementations, the ratio of constituents A, B, and C may vary more less than constituent D, and more generally, the ratio of constituents A, B, C, and D may vary overall. Moreover, additional or different constituents may be included in the sedimentary rock sample.

In FIG. 2, a representative area 24 may be determined. In some implementations, the representative area 24 may be selected in order to represent a particular ratio of the individual constituents A, B, C, and D, or may be selected randomly. For example, the representative area 24 includes a plurality of each of the individual constituents A, B, C, and D. In other implementations, the representative area 24 may be selected so that a disproportionate ratio of particular ones of the individual constituents A, B, C, and D are grouped together. For example, selecting the representative area 24 to include more or less of one of the individual constituents A or B or C and D may be desired. Similarly, selecting the representative area 24 to include more or less of one of the individual constituents A, B, C, or D may be desired. It may be preferable to include at least each of the individual constituents A, B, C, and D, in order to obtain a representation of constituents of the exemplary sedimentary rock sample.

In FIG. 2, although the representative area 24 may correlate to a two-dimensional space, a unit volume of the sedimentary rock sample 22 that includes the representative area 24 may be established.

Accordingly, a volume fraction $V_f$ for each of the individual constituents A, B, C, and D of the exemplary sedimentary rock sample 22 can be determined. For example, a volumetric fraction $V_{fm}$ of minerals A, B, and C may be calculated, and volumetric fraction $V_{fo}$ of the organic material D may be calculated based upon a known volume corresponding to the representative area 24.

Based upon the composition of the constituents A, B, and C within the exemplary sedimentary rock sample 220, various elastic properties of the constituents A, B, and C within the exemplary sedimentary rock sample 220 may be calculated, or may have already been calculated and are known. For example, if the composition of the constituents A, B, and C within the exemplary sedimentary rock sample 220 comprises silicon, iron, and aluminum, for which elastic properties are known, then their bulk modulus (K), shear modulus (G), compressional velocity (Vp), shear velocity (Vs), and density(ρ) may be calculated, or may be previously known and easily obtained.

However, in the case that the organic material constituent D has been identified as being kerogen, based upon its organic content, the composition of the kerogen may not be simply determined, and thus, elastic properties of the kerogen may not be completely calculated or known. Additionally, since the elastic properties of kerogen may vary widely from sample to sample, and are not well understood, full characterization of the exemplary sedimentary rock sample 220 may not be complete without a process for accurately determining both Bulk modulus and Shear modulus of kerogen.

Figure 4:
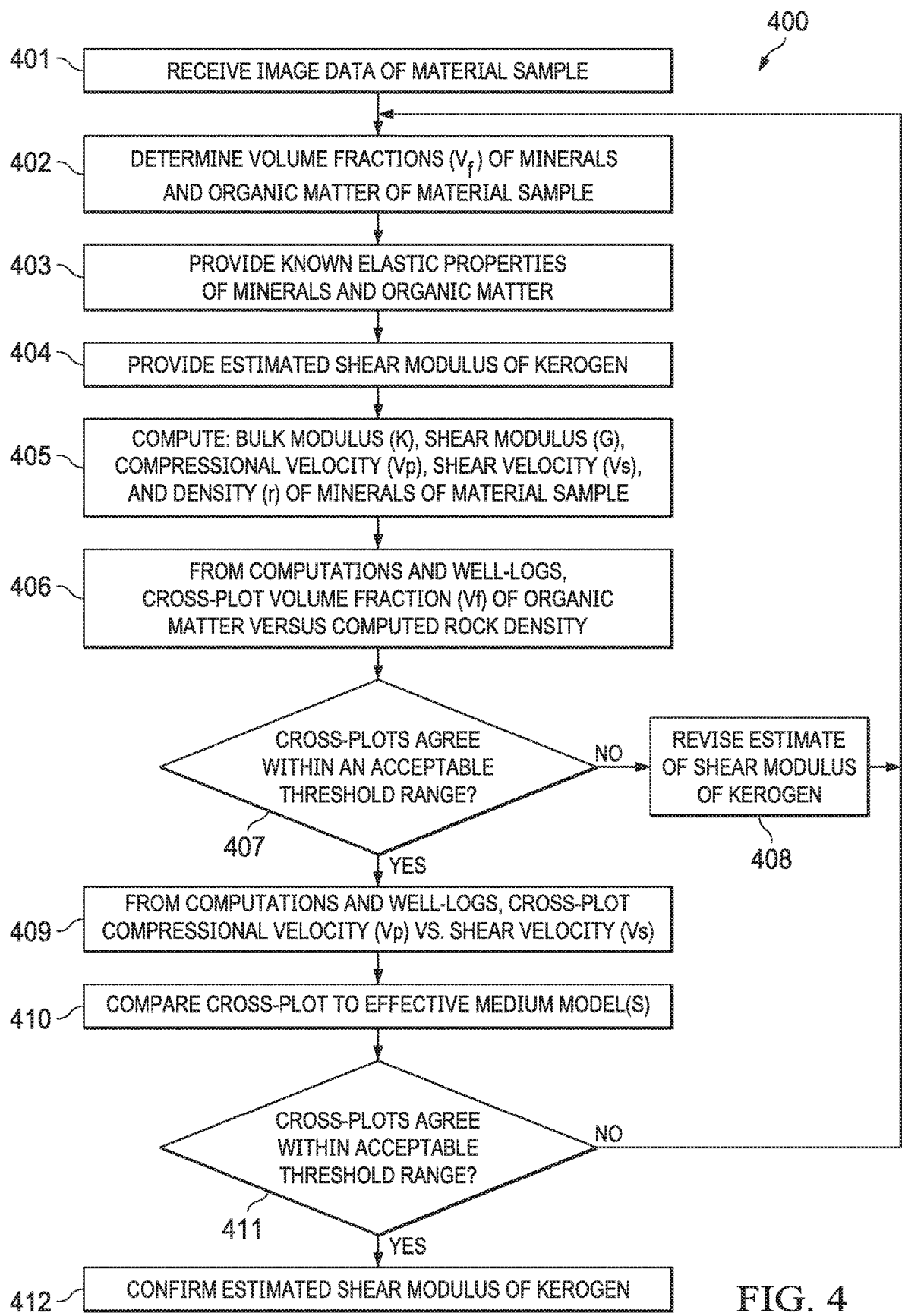
FIG. 4 is a flowchart that shows an exemplary process for determining Shear modulus of kerogen.

FIG. 4 is a flowchart showing an exemplary process for determining volume fractions of a material sample. In FIG. 4, at Step 301, a sample area of a material sample is determined from image data obtained for a material sample. In some implementations, the image data of a material sample is provided by an SEM image. For example, as shown in FIG. 2, the representative area 240 may be selected representing individual constituents of the material sample.

In Step 302, a unit volume of the material sample is determined. In some implementations, the unit volume may be calculated based upon a selected representative area of a material sample, such as the representative area 240 (in FIG. 2). For example, as discussed above with respect to FIG. 2, a unit volume of the representative area 240 may be determined, and a unit volume of the material sample can be calculated.

In Step 303, minerals and organic matter within the unit volume may be identified. In some implementations, identification of the minerals of the sample material may be determined by electrostatic discharge (ESD) analysis. Accordingly, individual minerals contained within the sample volume may be identified.

In Step 304, a volume of the minerals within the unit volume may be determined and a volume of organic matter within the unit volume may be determined. In some implementations, the volume of minerals within the unit volume may be determined by calculating a ratio of minerals to organic matter per unit volume. For example, by determining a unit volume (at Step 302) of the material sample and knowing a unit volumetric amount of each of the individual minerals within the unit volume, the volume of minerals within the unit volume may be calculated. Additionally, by knowing a ratio of minerals to organic material within the unit volume, the volume of organic matter within the unit volume can be calculated.

In Step 305, volume fractions $V_f$ of the material sample may be determined. In some implementations, a volume fraction $V_{fm}$ of minerals within the material sample can be calculated. For example, by knowing the volume occupied by the minerals within the unit volume of the material sample and the unit volume, the volume fraction $V_{fm}$ of minerals can be determined as a ratio of volume occupied by the minerals to the unit volume. In some implementations, a volume fraction $V_{fo}$ of organic matter within the material sample can be calculated. For example, by knowing the volume occupied by the organic material within the unit volume of the material sample and the unit volume, the volume fraction $V_{fo}$ of organic matter can be determined as a ratio of volume occupied by the organic material to the unit volume.

FIG. 4 is a flowchart that shows an exemplary process 400 for determining shear modulus of kerogen. According to FIG. 4, elastic properties can be predicted from image data, such as the SEM image shown in FIG. 2 and well-log data. Cross-property relationships can be used to identify suitability of an effective medium model and to iteratively determine the shear modulus of kerogen.

In FIG. 4, at Step 401, image data of a material rock sample is received. In some implementations, the image data includes an SEM image, such as that shown in FIG. 2, and an energy dispersive spectroscopy (EDS) graph. For example, an SEM image may be obtained for a selected portion of the material rock sample identifying the distribution of the constituents of the material rock sample, and an energy dispersive spectroscopy (EDS) graph may be obtained for the material rock sample portion identifying the individual constituents of the material rock sample.

Figure 3:
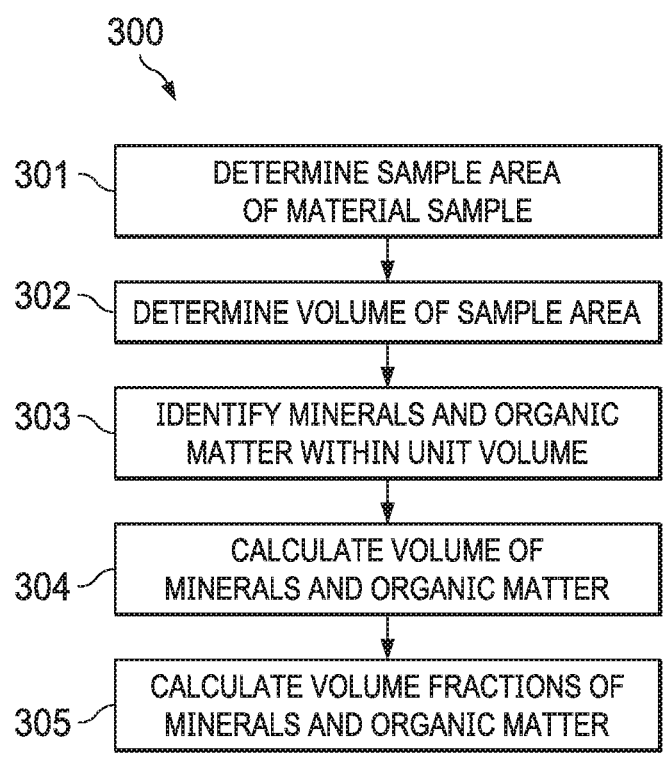
FIG. 3 is a flowchart showing an exemplary process for determining volume fractions of a material sample.

Next, at Step 402, volume fractions $V_f$ of the material rock sample can be determined. In some implementations, the volume fractions $V_f$ may be determined as described with respect to FIGS. 2 and 3. For example, the volume fraction $V_{fm}$ of minerals can be determined as a ratio of volume occupied by the minerals to a unit volume, and the volume fraction $V_{fk}$ of organic matter, such as kerogen, can be determined as a ratio of volume occupied by the organic matter to the unit volume.

At Step 403, elastic properties of the minerals identified in the material rock sample can be obtained from known sources. Additionally, bulk modulus of the kerogen identified in the material rock sample can be measured by known testing techniques or may be obtained from known sources. However, since the shear modulus of kerogen can vary widely from sample to sample, and is not well understood, an estimate of the shear modulus of kerogen is provided.

At Step 404, since shear modulus of kerogen is not well known, an estimated shear modulus of kerogen is provided. In some implementations, the estimated shear modulus of kerogen may be known within a particular range. However, the known ranges of shear modulus of kerogen is broad and applicable under specific material conditions.

At Step 405, elastic properties of the material rock sample are computed. In some implementations, bulk modulus K, shear modulus G, compressional velocity Vp, shear velocity Vs, and density ρ are calculated based upon known mechanical properties of the identified minerals. Additionally, based upon known elastic properties of kerogen and the estimated shear modulus, as provided at Step 404, the bulk modulus K, compressional velocity Vp, shear velocity Vs, and density ρ of the kerogen can be determined, or may be measured or previously known.

At Step 406, a cross-plot of volume fractions $V_{fk}$ of kerogen versus mineral density ρ from the computations from Step 405 and well-log data is made. In some implementations, the computations from Step 405 are made for multiple material samples, in which the distribution D and volume fractions $V_f$ of the minerals and kerogen are used to compute the volume fractions $V_{fk}$ of kerogen and mineral density ρ. For example, well-log data has been previously calculated for particular minerals. By comparing the cross-plots of volume fractions $V_{fk}$ of kerogen versus mineral density ρ from the computations from Step 405 with volume fractions $V_{fk}$ of kerogen versus mineral density ρ from well-log data, a preliminary determination can be made whether the estimate shear modulus of kerogen, which was made at Step 404, was reasonably correct or needs to be adjusted. For example, the cross-plots of the computations and well-log data may be considered to not be within an acceptable threshold range if there is a significant (or unacceptable) amount of difference shown by the cross-plots.

At Step 407, if the cross-plots of the computations and well-log data performed at Step 406 are determined to not be within an acceptable threshold range, then the estimated shear modulus of kerogen is revised, at Step 408, and provided at Step 404. Then, Steps 405 and 406 are performed again, and the compressional velocity Vp, the shear velocity Vs, and the density ρ of the kerogen are re-computed. At Step 406, another cross-plot of the volume fractions $V_{fk}$ of kerogen versus the mineral density ρ from the computations from Step 405 and well-log data is made. Then, a determination is made, at Step 407, whether cross-plots of the computations and well-log data performed at Step 406 are within an acceptable threshold range. This iterative cycle of steps may be repeated until the cross-plot of volume fractions $V_{fk}$ of kerogen versus mineral density ρ from the computations from Step 405 and well-log data are determined to be within an acceptable threshold range. Once the cross-plots of the computations and well-log data performed at Step 406 are determined to be within an acceptable threshold range, then the exemplary process 400 proceeds.

At Step 407, if the cross-plots of the computations and well-log data are determined to be within an acceptable threshold range, then, at Step 409, a cross-plot is made of the compressional velocity Vp and the shear velocity Vs for the computations and for the compressional velocity Vp and the shear velocity Vs obtained for the well-log data.

At Step 409, a cross-plot of the compressional velocity Vp versus the shear velocity Vs, which were calculated at Step 405, and the compressional velocity Vp versus the shear velocity Vs obtained from well-log data is made. In some implementations, the computations from Step 405 may be made iterative, in which multiple numerical model plots are provided.

At Step 410, a comparison is made with known effective-medium models between the cross-plots of the compressional velocity Vp versus the shear velocity Vs for both the computed well-log data and the numerical model. For example, by identifying an effective-medium model that mimics the trend from the computed well-log data, the shear modulus of kerogen may be accurately determined.

At Step 411, a determination is made whether the cross-plots of the compressional velocity Vp versus the shear velocity Vs for the computed well-log data and the numerical model are within an acceptable threshold range. For example, an acceptable threshold range may be determined and used to identify which of the effective-medium models mimic the trend from the computed well-log data. In some implementations, the acceptable threshold range may be predefined. For example, the acceptable threshold range may be determined prior to Step 411. In some implementations, the acceptable threshold range may be adjusted during Step 411. For example, while determining whether the cross-plots of the compressional velocity Vp versus the shear velocity Vs for the computed well-log data and the numerical model are within an acceptable threshold range at Step 411, if multiple effective-medium models have been identified as mimicking the trend from the computed well-log data, then the acceptable threshold range may be narrowed to a range until a maximum number of the effective-medium models are identified. Conversely, while determining whether the cross-plots of the compressional velocity Vp versus the shear velocity Vs for the computed well-log data and the numerical model are within an acceptable threshold range at Step 411, if no effective-medium models have been identified as mimicking the trend from the computed well-log data, then the acceptable threshold range may be widened to a range until a minimum number of the effective-medium models are identified.

At Step 411, if a particular effective-medium model does not mimic the trend from the computed well-log data within the acceptable threshold range, then Steps 402-411 may be repeated based upon a revision of the estimated shear modulus of kerogen.

At Step 412, if a particular effective-medium model mimics the trend from the computed well-log data within the acceptable threshold range, then the shear modulus of kerogen represented by the particular effective-medium model may be confirmed.

Figure 5A:
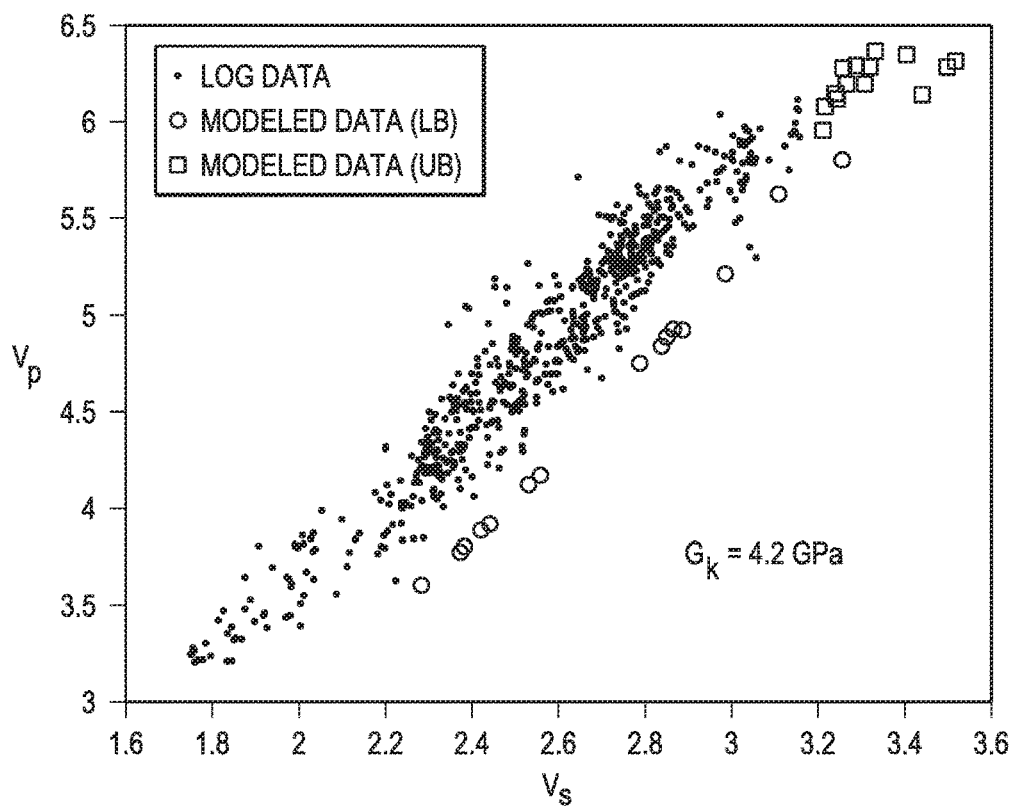
Figure 5B:
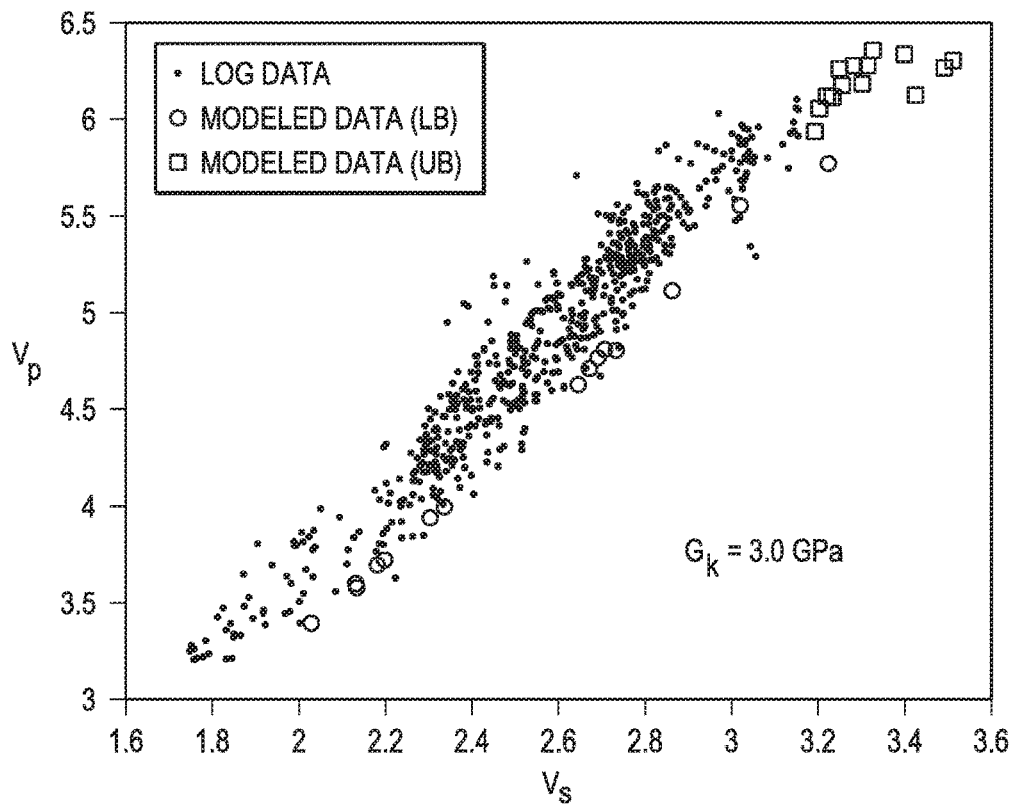

FIGS. 5A-5C are cross-plots of numerical calculations and effective medium models of shear velocity and compressional velocity. In FIGS. 5A-5C, a sensitive relationship exists between the compressional velocity Vp and the shear velocity Vs to the shear modulus of kerogen. For example, as shown in FIGS. 5A-5C, minor changes in the compressional velocity Vp and the shear velocity Vs may be indicative of significantly different shear moduli of kerogen $G_k$.

In FIG. 5A, for example, a significant difference is shown between the Vp-Vs relationship of the numerical model and the well-log data, in which the shear modulus of kerogen $G_k$ is determined to be 4.2 GPa. Here, due to the significant difference between the Vp-Vs relationship of the numerical model and the well-log data, the shear modulus estimated at Step 404 (in FIG. 4) may not be considered accurate.

In FIG. 5B, for example, a less significant difference is shown between the Vp-Vs relationship of the numerical model and the well-log data, in which the shear modulus of kerogen $G_k$ is determined to be 3.0 GPa. Here, due to the significant difference between the Vp-Vs relationship of the numerical model and the well-log data, the shear modulus estimated at Step 404 (in FIG. 4) may not be considered slightly more accurate than the shear modulus determined from the data in FIG. 5A.

In FIG. 5C, for example, almost no significant difference is shown between the Vp-Vs relationship of the numerical model and the well-log data, in which the shear modulus of kerogen $G_k$ is determined to be 1.9 GPa. Here, due to the amount of difference between the Vp-Vs relationship of the numerical model and the well-log data, the shear modulus estimated at Step 404 (in FIG. 4) may be considered accurate.

FIGS. 5A-5C demonstrate how minor changes in the shear modulus estimated at Step 404 (in FIG. 4) can affect the sensitivity of the Vp-Vs relationship. As the estimated shear modulus is iteratively improved using the exemplary process shown in FIG. 4, agreement between the well-log data and the numerical model improves and accuracy can improve for determining the shear modulus of kerogen.

Thus, particular implementations of the subject matter have been described. Other implementations are within the scope of the following claims.

The invention claimed is:

1. A method comprising:
   developing, by a computing device, a first numerical model of a rock sample, the first numerical model comprising modeled elastic properties of the rock sample including a first estimated elastic property of the rock sample;

calculating, by the computing device, elastic properties of the rock sample;

obtaining, by the computing device, a first result by comparing a first one of the calculated elastic properties of the rock sample with a second one of the calculated elastic properties of the rock sample;

obtaining, by the computing device, a second result by comparing a first one of the modeled elastic properties of the rock sample with a second one of the modeled elastic properties of the rock sample;

determining, by the computing device, that the first result and the second result are within a first acceptable threshold range, and in response to determining that the first result and the second result are not within the first acceptable threshold range, repeating calculations of elastic properties using a revised estimate for shear modulus of kerogen, obtaining the first result, and obtaining the second result until a determination is made that the first result and the second result are within the first acceptable threshold range;

comparing, by the computing device, based upon the determining that the first result and the second result are within a first acceptable threshold range, at least one of a second numerical model with the calculated elastic properties of the rock sample, wherein the at least one of a second numerical model comprises elastic properties of another rock sample;

determining, by the computing device, that the elastic properties of the second numerical model and the calculated elastic properties of the rock sample are within a second acceptable threshold range, and in response to determining that the elastic properties of the second numerical model and the calculated elastic properties of the rock sample are not within the second acceptable threshold range, repeating comparing the at least one of the second numerical model with the calculated elastic properties of the rock sample until a determination is made that the elastic properties of the second numerical model and the calculated elastic properties of the rock sample are within the second acceptable threshold range; and identifying, by the computing device, a particular one of the elastic properties of the at least one of a second numerical model, wherein a type of the particular one of the elastic properties of the at least one of a second numerical model is substantially the same as a type of the first estimated elastic property of the rock sample.

2. The method according to claim 1, wherein the developing a first numerical model of a rock sample includes determining a volume fraction of minerals comprising the rock sample and a volume fraction of organic matter comprising the rock sample.

3. The method according to claim 2, wherein the organic matter is kerogen.

4. The method of claim 3, where the type of the particular one of the elastic properties of the at least one of a second numerical model is a shear modulus of the kerogen.

5. The method of claim 1, wherein the calculating elastic properties of the rock sample includes calculating bulk modulus, shear modulus, compressional velocity, shear velocity, and density.

6. The method of claim 1, wherein the first set of calculated elastic properties of the rock sample includes a density of the rock sample, and the first portion of the first numerical model of the rock sample includes a volume fraction of kerogen.

7. The method of claim 6, wherein the second set of the calculated elastic properties of the rock sample includes a calculated compressional velocity and a calculated shear velocity of the rock sample, and the second portion of the first numerical model of the rock sample includes a numerical modeled compressional velocity and a numerical modeled shear velocity of the rock sample.

8. The method of claim 1, wherein the at least one of a second numerical model includes a plurality of effective-medium models.

9. The method of claim 8, wherein each of the plurality of effective-medium models includes a third set of calculated elastic properties of another rock sample.

10. The method of claim 9, wherein a type of the second set of calculated elastic properties of the rock sample is substantially the same as a type of the third set of calculated elastic properties of another rock sample.

11. The method of claim 1, further comprising:
determining that no second numerical models have been identified as having the calculated elastic properties of the rock sample; and
widening the acceptable threshold range until a minimum number of the second numerical models are identified.

12. A non-transitory computer readable medium storing instructions to cause a processor to perform operations comprising:

developing, by a computing device, a first numerical model of a rock sample, the first numerical model comprising modeled elastic properties of the rock sample including a first estimated elastic property of the rock sample;

calculating, by the computing device, elastic properties of the rock sample;

obtaining, by the computing device, a first result by comparing a first one of the calculated elastic properties of the rock sample with a second one of the calculated elastic properties of the rock sample;

obtaining, by the computing device, a second result by comparing a first one of the modeled elastic properties of the rock sample with a second one of the modeled elastic properties of the rock sample;

determining, by the computing device, that the first result and the second result are within a first acceptable threshold range, and in response to determining that the first result and the second result are not within the first acceptable threshold range, repeating calculations of elastic properties using a revised estimate for shear modulus of kerogen, obtaining the first result, and obtaining the second result until a determination is made that the first result and the second result are within the first acceptable threshold range;

comparing, by the computing device, based upon the determining that the first result and the second result are within a first acceptable threshold range, at least one of a second numerical model with the calculated elastic properties of the rock sample, wherein the at least one of a second numerical model comprises elastic properties of another rock sample;

determining, by the computing device, that the elastic properties of the second numerical model and the calculated elastic properties of the rock sample are within a second acceptable threshold range, and in response to determining that the elastic properties of the second numerical model and the calculated elastic properties of the rock sample are not within the second acceptable threshold range, repeating comparing the at least one of the second numerical model with the calculated elastic properties of the rock sample until a determination is made that the elastic properties of the second numerical model and the calculated elastic properties of the rock sample are within the second acceptable threshold range; and identifying, by the computing device, a particular one of the elastic properties of the at least one of a second numerical model, wherein a type of the particular one of the elastic properties of the at least one of a second numerical model is substantially the same as a type of the first estimated elastic property of the rock sample.

13. The computer readable medium according to claim 12, wherein the developing a first numerical model of a rock sample includes determining a volume fraction of minerals comprising the rock sample and a volume fraction of organic matter comprising the rock sample.

14. The computer readable medium according to claim 13, wherein the organic matter is kerogen.

15. The computer readable medium of claim 14, where the type of the particular one of the elastic properties of the at least one of a second numerical model is a shear modulus of the kerogen.

16. The computer readable medium of claim 12, wherein the calculating elastic properties of the rock sample includes calculating bulk modulus, shear modulus, compressional velocity, shear velocity, and density.

17. The computer readable medium of claim 12, wherein the first set of calculated elastic properties of the rock sample includes a density of the rock sample, and the first portion of the first numerical model of the rock sample includes a volume fraction of kerogen.

18. The computer readable medium of claim 17, wherein the second set of the calculated elastic properties of the rock sample includes a calculated compressional velocity and a calculated shear velocity of the rock sample, and the second portion of the first numerical model of the rock sample includes a numerical modeled compressional velocity and a numerical modeled shear velocity of the rock sample.

19. The computer readable medium of claim 12, wherein the at least one of a second numerical model includes a plurality of effective-medium models.

20. The computer readable medium of claim 19, wherein each of the plurality of effective-medium models includes a third set of calculated elastic properties of another rock sample.

21. The computer readable medium of claim 20, wherein a type of the second set of calculated elastic properties of the rock sample is substantially the same as a type of the third set of calculated elastic properties of another rock sample.

* * * * *